United States Patent

[11] 3,608,995

| [72] | Inventor | William E. Humphrey<br>Oakland, Calif. |
|---|---|---|
| [21] | Appl. No. | 757,287 |
| [22] | Filed | Sept. 4, 1968 |
| [45] | Patented | Sept. 28, 1971 |
| [73] | Assignee | Optical Research and Development Corporation<br>Oakland, Calif. |

[54] INTERMEDIATE OPTICAL PROCESSING STABILIZER
6 Claims, 4 Drawing Figs.

[52] U.S. Cl. ................................................ 350/16,
350/50, 356/149, 350/96 B
[51] Int. Cl. ........................................ G02b 23/02
[50] Field of Search ................................ 350/16;
95/12.5; 356/143, 148, 149, 248, 250; 74/5

[56] References Cited
UNITED STATES PATENTS

| 1,824,085 | 9/1931 | Karnes et al. ............... | 95/12.5 |
| 2,220,884 | 11/1940 | Burka et al. ............... | 356/149 |
| 2,389,142 | 11/1945 | Esval et al. ............... | 356/149 |
| 2,766,667 | 10/1956 | Harry et al. ............... | 95/12.5 |
| 3,424,520 | 1/1969 | Call ............... | 350/16 |
| 3,261,260 | 7/1966 | Strang ............... | 350/16 |

FOREIGN PATENTS

| 146,960 | 3/1962 | U.S.S.R. ............... | 350/16 |
| 347,869 | 10/1918 | Germany ............... | 95/12.5 |
| 1,015,916 | 1/1966 | Great Britain ............... | 350/16 |
| 185,500 | 1/1967 | U.S.S.R. ............... | 356/250 |

*Primary Examiner* — David H. Rubin
*Attorney* — Townsend and Townsend

ABSTRACT: An optical stabilizing device incorporating a relay optical system of substantially unit magnification which is inertially stabilized and adapted to relay an image from the objective lens focal surface a distance of one focal length of the objective lens which is insensitive to pivot-point mounting, and other than unity magnification which is stabilized by selected pivot-point mountings.

PATENTED SEP 28 1971

WILLIAM E. HUMPHREY
INVENTOR.

BY

Townsend and Townsend

PATENTED SEP 28 1971 3,608,995

WILLIAM E. HUMPHREY
INVENTOR.

BY
Townsend and Townsend

INTERMEDIATE OPTICAL PROCESSING STABILIZER

This invention relates to a new and improved image-stabilizing system for stabilizing the viewed image formed by a telescope objective.

The object of the present invention is to provide a new and improved image-stabilizing system for stabilizing the viewed image formed by a telescope objective upon vibration or motion of the objective and optical housing. The invention is thus particularly applicable for hand-held cameras and telescopes or cameras and telescopes mounted on moving systems. For ocular viewing devices it may be adapted for monocular or binocular use. "Viewing optics" and "viewing means" are used herein to include both camera viewing systems and ocular eyepiece systems.

In order to accomplish this result, the present invention contemplates providing a noninverting, parity-preserving optical relay system of substantially unit magnification interposed in the optical path between the telescope objective lens and viewing optics. The optical relay is mounted for free movement relative to the telescope objective lens and viewing optics about a pivot point lying along the optical path between the objective lens and viewing means. The optical relay is inertially stabilized and adapted to relay an image formed by the objective lens through a distance approximately equal to the focal length of the objective lens. The lens thereby acts as an optical "lever arm" having an effective length approximately equal to the focal length of the telescope objective and provides a stabilized image for viewing by the eyepiece lens or other viewing means.

Because the optical relay is of substantially unit magnification, the position of the pivot-point mounting of the optical relay is not critical and the pivot-point location may vary. Thus, the optical relay may be shock mounted permitting some translation of the pivot-point mounting location without affecting image stabilization.

The optical relay according to the invention is adapted to relay an image without inversion or change in parity of the image.

According to one embodiment of the invention, the optical relay comprises a pair of spaced-apart positive lenses which provide collimated light between the pair of lenses from light received from the objective lens. An erecting prism is positioned between the lenses having an even number of reflecting surfaces in the collimated light path. The optical relay, comprising the pair of spaced-apart lenses and intermediate erecting prism of even reflecting surfaces, is inertially stabilized and mounted for free movement relative to the telescope housing. A second erecting system is interposed in the light path between the telescope objective lens and the optical relay and is connected to the housing. The second erecting system is, for example, a porro prism erecting system. By means of the erecting prisms, the optical light path of the optical device may be substantially compressed within a small space.

According to another embodiment of the invention, the collimating optical relay comprises a pair of spaced-apart negative lenses which provide collimated light between the pair of lenses from light received from the objective lens. An erecting prism having an even number pair of reflecting surfaces is interposed in the collimated light path between the spaced-apart negative lenses. A lens-erecting system is then positioned between the optical relay and the telescope eyepiece to provide an erect image for viewing by the eyepiece. The optical relay is inertially stabilized relative to the telescope housing and telescope objective lens and viewing optics for free movement about a pivot point lying along the optical path between the telescope objective and viewing optics. The optical relay is adapted to relay the virtual image viewed by the relay a distance along the optical axis approximately equal to the focal length of the telescope objective lens.

Though a variety of noninverting, parity-preserving optical relays of substantially unit magnification may be utilized in making the present invention, the inertially stabilized, freely mounted, optical relay must provide an optical lever arm having an effective length substantially equal to the focal length of the telescope objective lens. By means of the erecting prisms having multiple reflecting surfaces as used in the embodiments of the invention described above, the optical elements may be compressed into a small space.

If the magnification of the optical relay varies from unity, the relay distance or optical lever arm necessary for image stabilization also differs from the focal length of the objective lens and depends upon the relay and the magnification of the optical objective lens focal length. If the magnification of the optical relay differs from substantial unity, the advantages of insensitivity to pivot-point mounting location are lost, but image stabilization can be attained according to the present invention by providing an appropriate optical relay distance or lever arm depending upon the magnification of the relay and the objective lens focal length. This determines the appropriate location of the pivot-point mounting relative to the objective lens.

It is possible with the image-stabilizing systems described above to achieve image stabilization of the type required for accidental-motion compensation, either with cameras or ocular viewing devices. In this respect, it is noted that for camera applications, accidental-motion compensators should maintain an image from the objective substantially stationary, or in a fixed position, on a film plane. In this way small accidental movements or vibrations of a camera housing to which the objective and film plane are mounted will be properly compensated so that a 100 percent stabilized image is presented to the film at the coincident stabilized image plane and film plane. On the other hand, ocular viewing devices such as ocular telescopes and binoculars ideally require a modified stabilization different from 100 percent so that light rays corresponding to the center of the desired field and leaving the device are parallel to the corresponding light rays entering the device and will therefore not appear to the viewer to be deflected with device vibrations. A full explanation of this difference in stabilization is set forth in my copending U.S. Pat. application Ser. No. 575,624, filed in the United States Patent Office on Aug. 29, 1966 and entitled "Optical Stabilization by Reflecting Means," now U.S. Pat. No. 3,468,595, issued Sept. 3, 1969. Reference is made to such above-identified patent application for a complete discussion of this point; however, it is briefly noted herein that camera stabilization, or 100 percent stabilization, as it is sometimes termed, is to be modified by the factor $(1\pm1/M)$ for ocular viewing devices wherein M is the magnification of the optical system defined by the angular size of the viewed field as seen through the instrument divided by the angular size as seen without the instrument. The fraction of "camera stabilization" required for erecting viewing devices is $(1-1/M)$ and for inverting viewing devices the fraction of "camera stabilization" is $(1+1/M)$. In the following discussion of the present invention, reference is generally made to 100 percent camera stabilization, and it is to be understood that such is to be modified by the foregoing factor for ocular viewing devices, such as binoculars, ocular telescopes and the like.

Thus, in the embodiments of the invention summarized above, the image-relay distance has been defined for 100 percent camera stabilization. The image-relay distance is approximately equal to the focal length of the telescope objective thereby providing an effective optical lever arm equal in length to the focal length of the telescope objective. Though such an arrangement is also satisfactory for ocular viewing devices and preferable to an unstabilized image, the ideal stabilization for ocular viewing devices is obtained by modifying the image relay or optical lever arm distance by one of the factors described above. For terrestrial and erecting ocular telescopes and binoculars, the image formed by the objective lens should be relayed by the collimating optical relay a distance equal to $(1-1/M)$ times that required for 100 percent camera stabilization. For astronomical and inverting telescopes, the image-relay distance should be equal to $(1+1/M)$ times that required for 100 percent camera stabilization.

In the following specification and accompanying drawings, the distance by which the image formed by the objective lens is relayed by the collimating optical relay is defined to provide 100 percent camera stabilization. Ideally, for ocular viewing devices, the image-relay distance is to be modified accordingly by the factors indicated above. One hundred percent camera stabilization provides satisfactory results in most cases, however.

Other features and advantages of the present invention will become apparent in the following specification and accompanying drawings. In the drawings.

Figure 1:
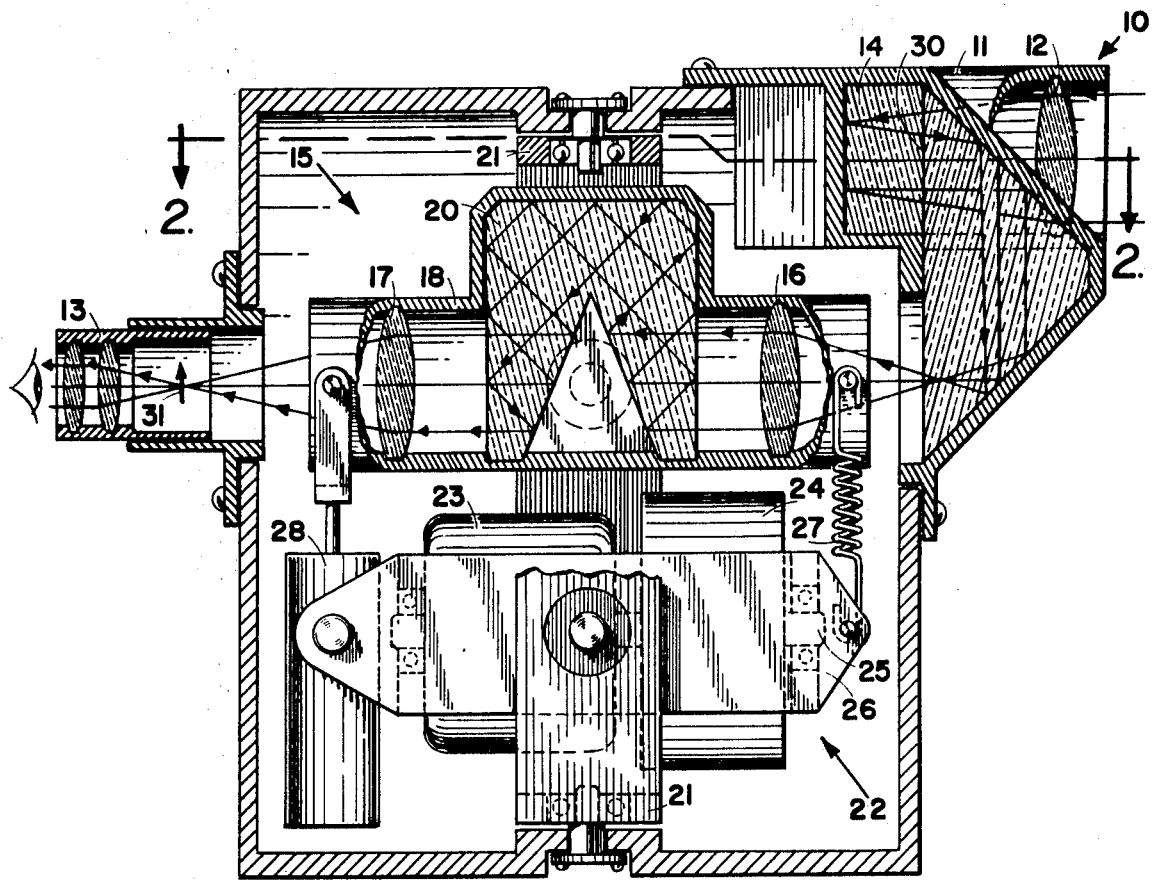
FIG. 1 is a side cross-sectional view of a telescope-image-stabilizing system embodying the present invention.
Figure 2:
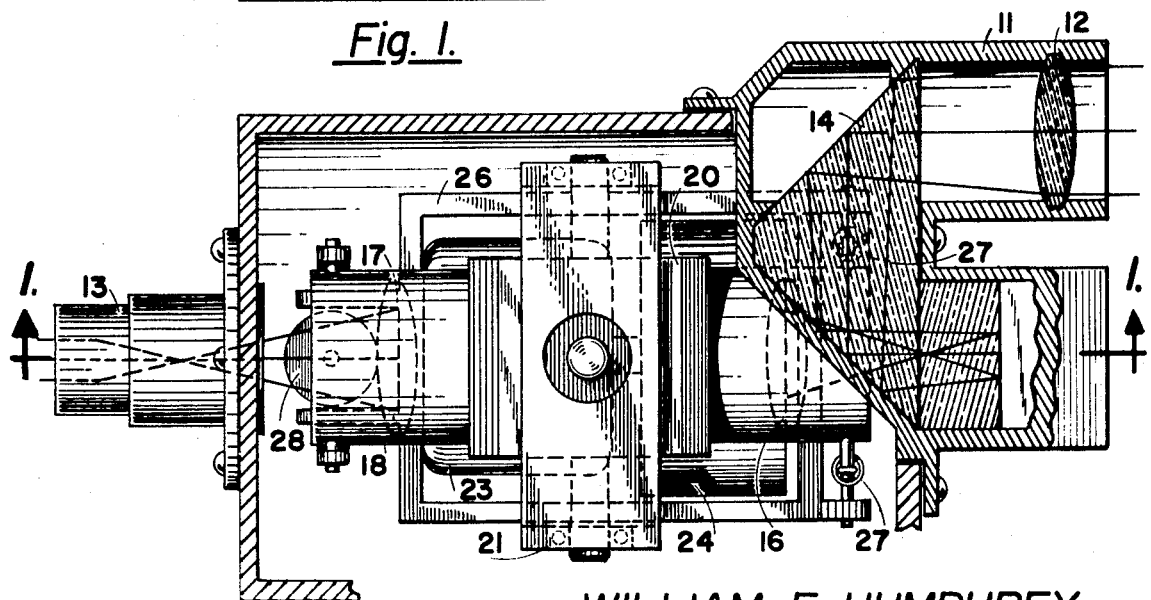
FIG. 2 is a plan view in partial cross section of the telescope-image-stabilizing system illustrated in FIG. 1 in the direction of the arrows on the line 2—2.

In the embodiment of the present invention illustrated in FIG. 1 there is provided a telescope 10 formed by a telescope housing 11 having a telescope objective lens 12 and an eyepiece 13 rigidly aligned with respect to the telescope housing 11. Also connected to the telescope housing 11 is a porro prism erecting system 14 adapted to receive light from the telescope objective lens 12 and reflect and fold the light passing through the prism. Mounted within the telescope housing 11 in the optical path between the porro prism erecting system 14 and telescope eyepiece 13 is an optical relay 15 of substantially unit magnification formed by a pair of spaced-apart positive lenses 16 and 17 mounted within a support 18. Positioned intermediate the pair of spaced-apart lenses 16 and 17 is an erecting prism 20 having an even number plurality of reflecting surfaces in the collimated light path between the lenses 16 and 17. The lenses 16 and 17 and erecting prism 20 are rigidly mounted with respect to each other in support 18. The optical relay 15 is mounted for free movement relative to the telescope housing 11 in gimbal 21 and is inertially stabilized by means of a gyroscope 22 similarly mounted within the gimbal.

The gyroscope is formed by a gyroscope drive motor 23 and gyroscope flywheel 24 mounted for rotation about an axle 25 within the gyroscope frame 26. The gyroscope 22 and optical relay 15 are resiliently biased with respect to each other by means of biasing springs 27 which resiliently maintain the gyroscope and optical relay in a predetermined axial alignment with respect to each other. The gyroscope and optical relay are also coupled by means of a lossy coupling 28 comprised of biasing springs and an energy-dissipating damping cylinder for dampening nutational motion of the gyroscope 22 produced by sudden impulses imparted to the gyroscope assembly 22. The details of the gyroscope mounting are set forth in my copending U.S. Pat. application, Ser. No. 757,252, entitled "Optical Device Gyro Linkage System," filed on even date herewith.

The support 18 for the collimating optical relay 15 is pivotally mounted within gimbal 21 which is in turn pivotally mounted in the telescope housing 11 about an axis orthogonal to the mounting axis of the support 18. Similarly, the gyroscope 22 is mounted pivotally within the gimbal 20 about an axis orthogonal to the mounting axis of the gimbal 20 within the telescope housing 11.

The optical parameters of the optical relay 15 are chosen so that the real image 30 formed by the telescope objective 12 is relayed or displaced a distance along the optic axis approximately equal to the focal length of the telescope objective 12 and in a direction away from the objective to provide an erect stabilized image 31 for viewing by the telescope eyepiece 13. The relay 15 thus provides an effective optical lever arm extending over the optical path distance between the relayed images 30 and 31. The separation of the relayed images is approximately equal to the focal length of the telescope objective 12 to provide effective stabilization of the viewed image.

Light from the normally inverted real image 30 formed by objective lens 12 is erected by the porro prism erecting system 14 and enters the optical relay 15. The light upon entering the relay 15 has been oriented to provide an upright image. The light is again inverted, however, by the erecting prism 20 having an even number of reflecting surfaces, but reinverted by the action of the lenses in the relay system to provide the erect upright image 31 for viewing by the telescope eyepiece 13. A prism may be required in the optical path of the deflected light from the objective lens and the stabilized optical relay to provide alignment and prevent blurring of the relayed image.

Figure 3:
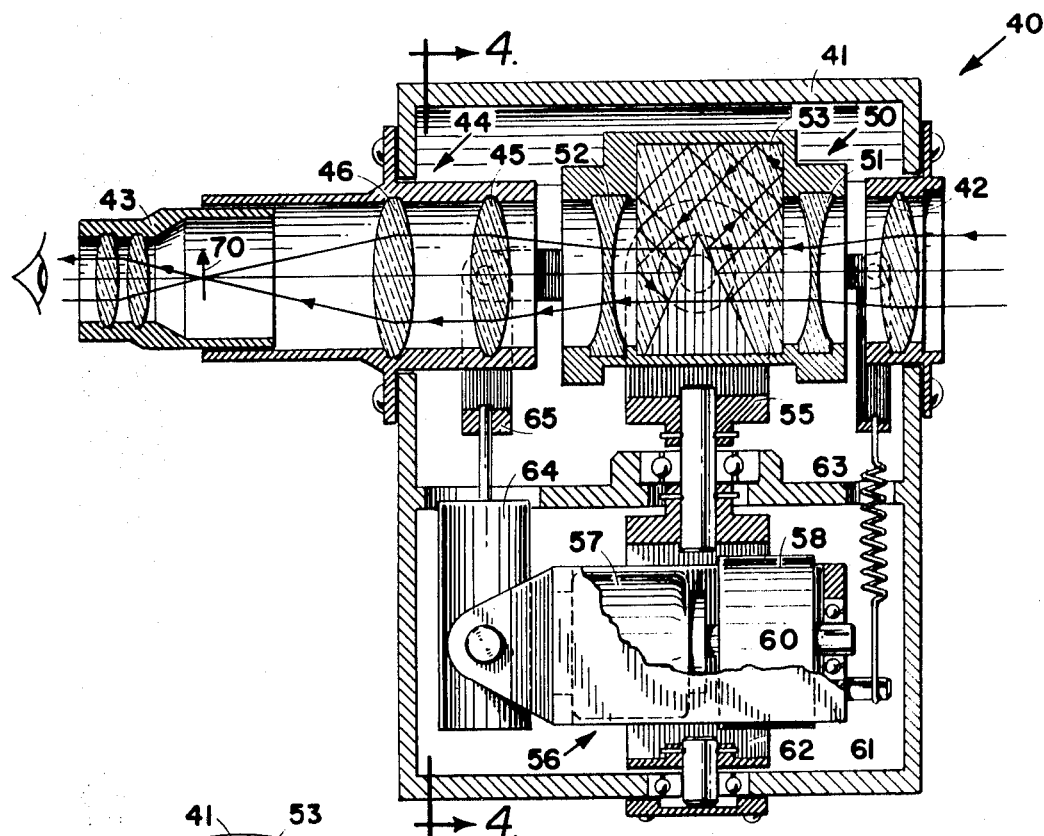
FIG. 3 is a side cross-sectional view of another telescope-image-stabilizing system.
Figure 4:
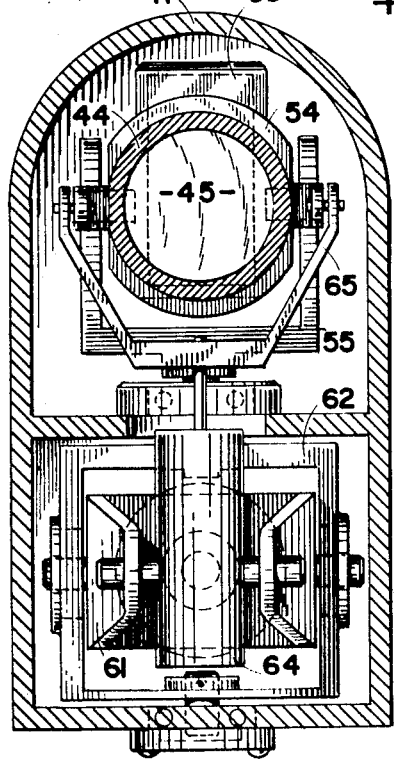
FIG. 4 is a front cross-sectional view of the telescope-image-stabilizing system illustrated in FIG. 3 in the direction of the arrows on the line 4—4.

In FIG. 3, there is shown a telescope 40 formed by a housing 41 having a telescope objective lens 42 and telescope eyepiece 43 rigidly oriented with respect to the telescope housing 41. Also connected to the telescope housing 41 in the optical path between the telescope objective and telescope eyepiece is an erecting relay 44 comprised of a pair of positive lenses 45 and 46.

Mounted within the telescope housing 41 is an optical relay 50 positioned in the optical path between the telescope objective 42 and the lens-erecting system 44. The optical relay 50 is formed by a pair of spaced-apart negative lenses 51 and 52 and an intermediate erecting prism 53 having an even-numbered plurality of reflecting surfaces in the optical path between the negative lenses 51 and 52. In this example, optical relay 50 is positioned so that converging light from the telescope objective lens 42 is collimated by lens 51, relayed through the erecting prism 53, and diverged by negative lens 52 to pass through the lens-erecting system 44.

The negative lenses 51 and 52 and erecting prism 53 are rigidly connected with respect to each other by a support 54. The collimating relay 50 is mounted for free movement relative to the telescope housing. The support 54 is mounted pivotally within a gimbal 55 which is in turn pivotally mounted in the telescope housing about an axis orthogonal to the mounting axis of the support 54 within gimbal 55. The collimating relay 50 is inertially stabilized by means of a gyroscope 56 formed by a gyroscope drive motor 57 and gyroscope flywheel 58 mounted for rotation about the gyroscope axle 60 within a gyroscope frame 61. The gyroscope is similarly mounted for free movement relative to the telescope housing 41 within gimbal 62. The gyroscope 56 and collimating relay 50 are resiliently biased with respect to each other by means of biasing springs 63 which resiliently maintain the collimating relay 50 and gyroscope 56 in predetermined axial alignment with respect to each other. The collimating relay 50 and gyroscope 56 are also coupled together by means of a lossy coupling 64 formed by biasing springs and an energy-dissipating damping cylinder for damping nutational motion of the gyroscope 56 produced by sudden impulses imparted to the gyroscope assembly 56. The lossy coupling 64 is pivotally connected at one end to the gyroscope frame 61 and pivotally connected at the other end by means of a yoke 65 to arms 66 extending from the collimating relay support 54. Details of the gyroscope-mounting system are described in my copending U.S. Pat. application, Ser. No. 757,252, filed Sept. 4, 1968 entitled "Optical Device Gyro Linkage System" and referred to above.

The collimating relay 50 is positioned so that converging light from the telescope objective 42 is received by negative lens 51 before the focal plane of the objective lens 42 and collimated for passage through the erecting prism 53. Because of the arrangement of the even number of reflecting surfaces the light is inverted so that upon emerging from the negative lens 52 it must be reinverted by the lens-erecting system 44 to provide an erect real image 70 for viewing by the telescope eyepiece 43.

The freely mounted optical relay 50 provides an effective optical lever arm approximately equal in length to the focal length of the telescope objective lens 42. Thus, the light converging from telescope objective lens 42 is displaced by the collimating relay 50 a distance along the optical axis approximately equal to to the focal length of the objective lens. As viewed from the erecting lens system 44, the negative lenses 51 and 52 of the collimating relay 50 produce an image from light received from objective lens 42 which is displaced along the axis by the collimating optical relay a distance approximately equal to the focal length of the objective lens and in the direction toward the objective lens.

It is apparent that other forms of noninverting parity preserving optical relays of substantially unit magnification may be utilized according to the present invention to provide an optical lever arm an effective length substantially equal to the focal length of the telescope objective. Thus, a linear fiber optics bundle having a fused plate at each end for receiving a real image from the telescope objective lens and transmitting the image to the telescope viewing optics may be used. The linear fiber optics bundle is mounted for free movement relative to the telescope housing about a pivot point intermediate the ends of the fiber optics bundle. Similarly, a simple erector comprised of a series of spaced-apart positive lenses without an intermediate erecting prism may also be used. However, the lenses must be spaced apart a distance sufficient to provide a displacement of an image formed by the objective lens a path distance approximately equal to the focal length of the telescope objective and they must not invert or appreciably alter the image size. An optical relay using a single lens and a prism may also be used. It is apparent that the use of prisms having multiple reflecting surfaces permits compaction of the optical relay into a small space. If the magnification of the optical relay differs from substantial unity the optical relay distance necessary for image stabilization also varies, depending upon the magnification of the relay and the objective lens focal length. This determines the pivot-point location relative to the objective lens.

Ideally, for ocular telescopes and binoculars the collimating optical relay should be formed to relay the image formed by the telescope objective a distance equal to $(1\pm1/M)$ times the focal length of the objective lens to thereby provide an effective optical lever arm of that length, where M is the magnification of the telescope and viewing optics and wherein the minus sign is used for erecting telescopes and the plus sign is used for inverting telescopes.

I claim:

1. An image-stabilizing system comprising: an objective lens; viewing means for viewing an image formed by said objective lens; a noninverting, parity-preserving optical relay interposed in optical alignment in the optical path between the objective lens and viewing means, said optical relay adapted to relay an image formed by the objective lens a distance related to the magnification of the optical relay and the focal length of the objective lens, said optical relay pivotally mounted for free angular movement relative to the objective lens and viewing means about a pivot point lying between the objective lens and viewing means; and means for inertially stablilizing the optical relay to maintain said optical relay in a fixed angular position in space when said viewing means and objective lens are angularly moved and wherein said optical relay is a substantial unit magnification and wherein said relay distance is substantially equal to the focal length of the objective lens.

2. An image-stabilizing system as set forth in claim 1 wherein said optical relay is of substantially unit magnification and wherein said relay distance is substantially equal to the focal length of the objective lens.

3. An image-stabilizing system for stabilizing a viewed image comprising: an objective lens; viewing means adapted for viewing an image formed by said objective lens; an optical relay of substantially unit magnification interposed in optical alignment in the optical path between the objective lens and viewing means, said optical relay adapted to relay an image formed by the objective lens a distance substantially equal to the focal length of the objective lens, said optical relay pivotally mounted for free movement relative to the telescope objective lens and viewing means about a pivot point lying between the objective lens and viewing means; and means for inertially stabilizing the optical relay.

4. An image-stabilizing stabilizing system as set forth in claim 3 wherein said viewing means comprises an eyepiece lens system and wherein said optical relay is adapted to relay an image formed by the objective lens means an optical path distance approximately equal to $(1\pm1/M)$ times the focal length of the objective lens means wherein M is the magnification of the stabilizing system and wherein the plus sign is used for inverting telescopes and the minus sign is used for erecting telescopes.

5. An image-stabilizing system comprising: objective lens means adapted to form an image; an erect image optical relay means of substantially unit magnification positioned in optical alignment to receive light from a real image formed by the objective lens means and relay an image formed by the objective lens means an optical path distance substantially equal to the focal length of the objective lens means; viewing means for viewing the relayed images, said viewing means rigidly mounted with respect to said objective lens means; means mounting said optical relay means for free movement relative to the objective lens means and viewing means about a pivot point lying between the objective lens means and viewing means; and means for inertially stabilizing the optical relay means for movement relative to the objective means and viewing means about said pivot point.

6. An image-stabilizing system comprising: objective lens means adapted to form a first image of a field in a plane spaced from said objective lens means; a noninverting parity-preserving optical relay system of substantially unit magnification comprised of at least one lens, said optical relay system optically aligned to receive light from a first image formed by said objective means, and form a second image in a plane spaced from the optical relay system an optical path distance substantially equal to the focal length of the objective lens means; viewing means optically aligned for viewing the second image formed by said optical relay system; means pivotally mounting said optical relay system for free movement relative to the objective lens means and viewing means about a pivot point therebetween; means for inertially stabilizing the optical relay system for relative movement of the objective lens means and viewing means about said pivot point.